Patented Dec. 4, 1934

1,983,045

UNITED STATES PATENT OFFICE 1,983,045

COLORING MATTER DERIVED FROM PYRAZOLONES

Ralph B. Payne, Elma, and Karl Friedrich Conrad, Buffalo, N. Y., assignors to National Aniline and Chemical Company, Inc., New York, N. Y., a corporation of New York No Drawing. Application May 26, 1930, Serial No. 455,947

20 Claims. (Cl. 260—87)

The present invention relates to new coloring matters and to compositions containing the same. The process of preparing the new coloring matters and the process of preparing the compositions containing the same also form a part of the present invention.

The new coloring matters of the present invention comprise the organic reaction products of a dyestuff containing an acid group in its molecule with a pyrazolone compound. Further, in accordance with the present invention, the new coloring matters may be compounded with plastic, coating or molding compositions, such as natural or artificial resins (e. g., shellac, "Bakelite" resins, urea-formaldehyde resins, etc.), pyroxylin, cellulose esters and ethers, varnish, etc., with or without the presence of a suitable solvent therefor, they may be employed in the preparation of pigments or lakes, or they may be employed in solution with a suitable solvent as stains, etc.

In accordance with the present invention, the new coloring matters may be prepared by reacting a pyrazolone compound with a dyestuff containing at least one acid group, particularly a sulfonic group, in its molecule. The combination conveniently may be effected by reacting, in the presence of an acid or of an alkali, a metal salt of the said dyestuff with a pyrazolone. The reaction is preferably carried out in an aqueous medium by adding to a hot water solution of the water soluble metal salt of the dyestuff a solution of a pyrazolone compound in dilute acid to form the new coloring matter which is precipitated out of solution, and may be separated, as by filtration, and dried.

In general, the new coloring matters differ in solubility in various solvents in a marked degree from the parent dyestuffs from which they are prepared. Their solubility in various solvents, as well as other properties, depend on whether the combination is effected in acid or alkaline medium. Generally, the solubility in water of the new coloring matters is less than that of the parent dyestuffs. Those which are insoluble in water are useful as pigments, lakes, etc., while those which are soluble in alcohol, or in ethyl acetate, amyl acetate, acetone, etc., are useful in lacquers, stains, etc. The shade or color of the new coloring matters may or may not be different from that of the initial dye.

The new coloring matters may be incorporated with various compositions, as hereinbefore mentioned. Varnishes colored with the new spirit soluble coloring matters furnish coatings distinguished by richness of shade and brightness on materials of all kinds. The alcohol soluble new coloring matters further have a distinct advantage over oil soluble dyes ordinarily used in celluloid compositions in that celluloid plastics colored with the new dyes can be cemented to white or to other different shades of celluloid without bleeding. The new alcohol soluble dyes are particularly desirable for staining wood which is to be coated with a pyroxylin lacquer, since no running of the color occurs.

The above general designation "a dyestuff containing at least one acid group in its molecule" will readily be understood to denote and include dyestuffs of all classes, or salts thereof, which contain true acid groups, such as the sulfonic acid group or carboxylic acid group, and particularly those of the class of acid dyestuffs, and not to include dyestuffs which contain a phenolic hydroxyl group but not a true acid group. The invention is particularly applicable to the conversion into new coloring matters of acid dyestuffs of the azo class, such as the monazo-, disazo-, trisazo-, etc., acid dyes, and more particularly of the monazo dyestuffs containing a sulfonic group. Among the large number of dyestuffs which may be converted into the new dyestuffs of the present invention may be mentioned the following:

| | Colour Index |
|---|---|
| Wool Orange A | 151 |
| Alphazurine FG | 671 |
| Alizarine Cyanine Green GX | 1078 |
| Fast Wool Yellow 3GL | 636 |
| Crocein Scarlet MOO | 252 |
| Crocein Orange Y | 26 |
| Lake Scarlet R | 79 |
| Metanil Yellow | 138 |
| Wool Orange 2G | 27 |
| Azorubine | 179 |
| Fast Crimson GR | 31 |
| Fast Crimson 6BL | 57 |
| Wool Orange R | 161 |
| Fast Wool Blue R | 208 |
| Rhodamine B | 749 |

The term "pyrazolone compound", as used in the specification and claims, will be understood to denote and include pyrazolone and substituted pyrazolones, for example, pyrazolone carboxylic acid, aryl pyrazolones, aryl pyrazolone carboxylic acids, aryl-alkyl-pyrazolone-carboxylic acids, and aryl-alkyl-pyrazolones which may also contain alkyl groups and/or inorganic substituents in the aryl nucleus, more particularly the phenyl-methyl-pyrazolones. The pyrazolone compounds of the 5-pyrazolone series are especially of value.

Examples of suitable compounds are antipyrene, 1-phenyl-3-methyl-5-pyrazolone, 1-(p-sulfophenyl)-3-methyl-5-pyrazolone, 1-(2'-chlor-5'-sulfophenyl)-3-methyl-5-pyrazolone, 1-phenyl-3-carboxy-5-pyrazolone, 1-phenyl-3-pyrazolone, 1-phenyl-5-methyl-3-pyrazolone, etc.

We are unable to definitely state the nature or composition of the new organic coloring matters, although we believe that they are probably addition compounds of the pyrazolone compounds with the dyestuffs employed. Due to the amphoteric nature of the pyrazolones, particularly the phenyl methyl pyrazolones, two series of the new coloring matters may be formed, one series by reaction in the presence of an alkali, and the other series in the presence of an acid. The reaction between the pyrazolone compounds and the acid dyestuffs is not a coupling reaction of a diazo compound with a pyrazolone compound, and it is to be understood that such coupling reactions are not included within the scope of the present invention.

The invention may be illustrated by the following examples: The parts are by weight.

Example 1.—To a boiling solution of 50 parts of the sodium salt of 4-benzene-azo-1-(2'-chlor-5'-sulfophenyl)-3-methyl-5-hydroxypyrazol dissolved in 2000 parts of water, there is added an aqueous solution containing about 2.6 per cent. of 1-phenyl-3-methyl-5-pyrazolone and 3.4 per cent. of hydrochloric acid until the precipitation of the new coloring matter is substantially complete. The precipitated coloring matter is filtered hot, washed and dried. It is a yellow powder sparingly soluble in water, soluble in alcohol, acetone, amyl acetate and ethyl acetate.

Example 2.—To a boiling solution of 10 parts Fast Wool Yellow 3GL in the form of the mono sodium salt, dissolved in 500 parts of water, there is added an aqueous solution containing about 8.6 per cent. of antipyrene and 5.3 per cent. of HCl until the precipitation of the new coloring matter is substantially complete. The precipitated coloring matter is filtered off, washed and dried. It is a yellow powder, sparingly soluble in water and soluble in alcohol.

Example 3.—To a boiling solution of 10 parts Alphazurine FG in the form of the ammonium salt, dissolved in 500 parts of water heated to boiling, there is added an aqueous solution containing about 8.6 per cent. phenyl methyl pyrazolone and 5.3 per cent. HCL, until the precipitation of the new coloring matter is substantially complete. The precipitated coloring matter is filtered, washed and dried. It is a blue powder, sparingly soluble in water and soluble in alcohol.

Example 4.—By following the procedure described in Example 3, using 10 parts Alizarine Cyanine Green GX as its sodium salt in place of the Alphazurine FG, a new coloring matter is obtained, which when dried and powdered, is a green powder, soluble in alcohol.

Example 5.—By following the procedure described in Example 3, using 10 parts wool orange A as its sodium salt, in place of Alphazurine FG, a new coloring matter is obtained, which, when dried and powdered, is an orange powder soluble in alcohol.

The procedure, as described in the above examples, is not dependent upon any theory for its operativeness, it being only necessary to add the acid solution of the pyrazolone compound until reaction is complete, as indicated when no increase in the quantity of precipitate is noted.

The proportion of water and acid employed, the temperature, and other conditions may be varied through wide limits. Also in place of hydrochloric acid, other mineral acids, e. g., sulfuric acid, or organic acids, e. g., acetic acid, may be employed.

Example 6.—To a boiling solution of 25 parts Crocein Orange Y in the form of the mono sodium salt dissolved in 1500 parts of water, there is added an aqueous solution containing about 25 parts 1-phenyl-3-methyl-5-pyrazolone and 10 parts soda ash in 500 parts water. The precipitated coloring matter is filtered off, washed and dried. It is an orange powder, sparingly soluble in water and insoluble in alcohol.

In a similar manner, the alkaline series of new coloring matters may be produced by dissolving a pyrazolone compound in a suitable alkali, for example, caustic soda, soda ash, etc., and adding the resulting solution to a solution of the dyestuff. The precipitate which forms is washed and dried in a similar manner.

Example 7.—Pyroxylin molding composition

One part yellow coloring matter, obtained by reacting in acid solution the sodium salt of 4-benzene-azo-1-(2'-chlor-5'-sulfophenyl)-3-methyl-5-hydroxypyrazol with phenyl methyl pyrazolone as described above in Example 1, is dissolved in 1 gallon alcohol, and sufficient of this solution is then added to a mixture of

| | Parts |
|---|---|
| Pyroxylin | 100 |
| Camphor | 35 |
| Urea | 1 | to produce the desired shade. This colored plastic mass is then molded under heat and pressure.

Example 8.—Wood stain

One part green coloring matter, obtained by reacting in acid solution Alizarine Cyanine Green GX with phenyl methyl pyrazolone as described above in Example 4, is dissolved in 25 parts of denatured alcohol. About 10 parts benzol are then added. The resulting solution stains wood a bright green which is fast to light and does not bleed, when coated with a pyroxylin lacquer. The stain does not raise the grain of the wood.

Example 9.—Pyroxylin lacquer

One ounce blue coloring matter, obtained by reacting in acid solution Alphazurine FG with phenyl methyl pyrazolone, as described above in Example 3, is dissolved in one pint of denatured alcohol. Sufficient of this solution is added to a pyroxylin lacquer prepared by mixing.

| | |
|---|---|
| Nitrocellulose | 23 oz. |
| Gum damar | 8 oz. |
| Ester gum | 8 oz. |
| Tricresyl phosphate | 8 oz. |
| Butyl acetate | 2 pts. |
| Butanol | 4 pts. | to produce the desired shade.

Example 10.—"Bakelite" C composition

| | Parts |
|---|---|
| "Bakelite" A | 100 |
| Wood flour | 100 |
| Orange coloring matter (prepared as described in Example 5) | 2 |

The above ingredients are intimately mixed and then milled into sheets, powdered, and molded under heat and pressure to form a colored "Bakelite" C composition.

Since changes in the invention above described may be made without departing from its scope, the above description is to be construed as illustrating rather than limiting the invention. It is also to be understood that the following claims are intended to cover the generic and specific features of the invention herein disclosed, and all statements of the scope of the invention which, as a matter of language, might be said to fall therebetween.

We claim:

1. A composition of matter comprising the organic reaction product of a pyrazolone compound with a dyestuff containing at least one acid group but not containing a diazo group.

2. A composition of matter comprising the organic reaction product of an aryl pyrazolone compound with a dyestuff containing at least one acid group but not containing a diazo group.

3. A composition of matter comprising the organic reaction product of a pyrazolone compound in acid solution with a salt of an acid dyestuff which does not contain a diazo group.

4. A composition of matter comprising the organic reaction product of a pyrazolone compound with an azo dyestuff containing at least one acid group but not containing a diazo group.

5. A composition of matter comprising the organic reaction product of an aryl-5-pyrazolone compound with a dyestuff containing at least one acid group but not containing a diazo group.

6. A composition of matter comprising the organic reaction product of a phenyl methyl-pyrazolone with an azo dyestuff containing at least one acid group but not containing a diazo group.

7. A composition of matter comprising the organic reaction product of 1-phenyl-3-methyl-5-pyrazolone in acid solution with a soluble metal salt of a monazo dyestuff containing at least one sulfo group but not containing a diazo group.

8. A composition of matter comprising the organic reaction product of 1-phenyl-3-methyl-5-pyrazolone in acid solution with the sodium salt of 4-benzene-azo-1-(2'-chlor-5'-sulfophenyl)-3-methyl-5-hydroxypyrazol.

9. A composition of matter comprising the organic reaction product of 1-phenyl-3-methyl-5-pyrazolone in acid solution with wool orange A in the form of its sodium salt.

10. The process for producing a colored composition which comprises reacting a pyrazolone compound with a dyestuff containing at least one acid group but not containing a diazo group.

11. The process for producing a colored composition which comprises reacting a pyrazolone compound in acid solution with a salt of an acid dyestuff which does not contain a diazo group.

12. The process for producing a colored composition which comprises reacting a pyrazolone compound in acid solution with the soluble metal salt of an azo dyestuff containing at least one acid group but not containing a diazo group.

13. The process for producing a colored composition which comprises reacting an aryl pyrazolone in acid solution with a soluble metal salt of a dyestuff containing at least one acid group but not containing a diazo group.

14. The process for producing a colored composition which comprises reacting an aryl-5-pyrazolone compound in acid solution with a soluble metal salt of an azo dyestuff containing at least one acid group but not containing a diazo group.

15. The process for producing a colored composition which comprises reacting a phenyl methyl pyrazolone compound with an azo dyestuff containing at least one acid group but not containing a diazo group.

16. The process for producing a colored composition which comprises reacting 1-phenyl-3-methyl-5-pyrazolone in acid solution with a soluble metal salt of a monazo dyestuff containing at least one sulfo group but not containing a diazo group.

17. The process for producing a colored composition which comprises reacting 1-phenyl-3-methyl-5-pyrazolone in acid solution with the sodium salt of 4-benzene-azo-1-(2'-chlor-5'-sulfophenyl)-3-methyl-5-hydroxypyrazol.

18. The process for producing a colored composition which comprises reacting 1-phenyl-3-methyl-5-pyrazolone in acid solution with wool orange A in the form of an alkali metal salt.

19. A composition of matter comprising the organic reaction product of 1-phenyl-3-methyl-5-pyrazolone in acid solution with Crocein Scarlet MOO.

20. The process for producing a colored composition which comprises reacting 1-phenyl-3-methyl-5-pyrazolone in acid solution with Crocein Scarlet MOO.

RALPH B. PAYNE.
KARL FRIEDRICH CONRAD.